United States Patent
Hamada

(10) Patent No.: US 6,704,137 B2
(45) Date of Patent: Mar. 9, 2004

(54) OPTICAL AMPLIFIER, METHOD FOR OPTICAL AMPLIFICATION AND OPTICAL TRANSMISSION SYSTEM

(75) Inventor: Satoshi Hamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/938,518

(22) Filed: Aug. 27, 2001

(65) Prior Publication Data

US 2002/0024726 A1 Feb. 28, 2002

(30) Foreign Application Priority Data

Aug. 31, 2000  (JP) ..................... 2000-263884

(51) Int. Cl.[7] ............................................. H01S 3/00
(52) U.S. Cl. ................................................. 359/341.3
(58) Field of Search ........................ 372/70; 359/341.3, 359/341.32, 337.12

(56) References Cited

U.S. PATENT DOCUMENTS

| | | | |
|---|---|---|---|
| 5,594,748 A | * 1/1997 | Jabr ........................ 372/38.09 |
| 5,900,968 A | * 5/1999 | Srivastava et al. ..... 359/341.41 |
| 5,978,130 A | * 11/1999 | Fee et al. ............... 359/341.32 |
| 5,991,069 A | * 11/1999 | Jander ........................ 359/337 |
| 6,163,395 A | * 12/2000 | Nemecek et al. ........... 359/187 |
| 6,320,694 B1 | * 11/2001 | Ohshima ................ 359/341.33 |
| 6,320,695 B1 | * 11/2001 | Tanaka et al. ......... 359/341.33 |
| 6,339,495 B1 | * 1/2002 | Cowle et al. ............. 359/341.4 |
| 6,342,965 B1 | * 1/2002 | Kinoshita ................... 359/334 |
| 6,359,730 B2 | * 3/2002 | Tervonen .................... 359/349 |
| 6,384,965 B2 | * 5/2002 | Akiyama ................. 359/341.4 |
| 6,426,833 B1 | * 7/2002 | Bao ....................... 359/341.32 |
| 6,449,085 B1 | * 9/2002 | Okazaki ................ 359/337.12 |
| 6,456,637 B1 | * 9/2002 | Holcomb et al. ............. 372/40 |
| 6,476,960 B1 | * 11/2002 | Traynor et al. ........ 359/341.31 |
| 6,493,088 B1 | * 12/2002 | Hui et al. ................... 356/450 |
| 2002/0122244 A1 | * 9/2002 | Sotgiu et al. ............. 359/341.3 |
| 2002/0159138 A1 | * 10/2002 | Zou ....................... 359/341.32 |

* cited by examiner

Primary Examiner—Thomas G. Black
Assistant Examiner—Deandra M. Hughes
(74) Attorney, Agent, or Firm—Sughrue Mion, PLLC

(57) ABSTRACT

The present invention provides an optical amplifier for amplifying and outputting an input optical signal, and the optical amplifier comprises an erbium-doped optical fiber (EDF) (3), a laser diode (1), a WDM coupler (2), and a temperature setting control unit (8). A pumping light outputted from the laser diode (1) is divided at a given wavelength by the WDM coupler (2) to a light component on long wavelength side and a light component on short wavelength side, and these are separately outputted. Among these light components, the light component on long wavelength side is inputted to the EDF (3) as a forward pumping light. The light component on short wavelength side is inputted as a backward pumping light. The temperature setting control unit (8) sets a ratio of forward pumping light intensity to backward pumping light intensity and controls temperature of the laser light source according to the preset value.

5 Claims, 21 Drawing Sheets

PRIOR ART

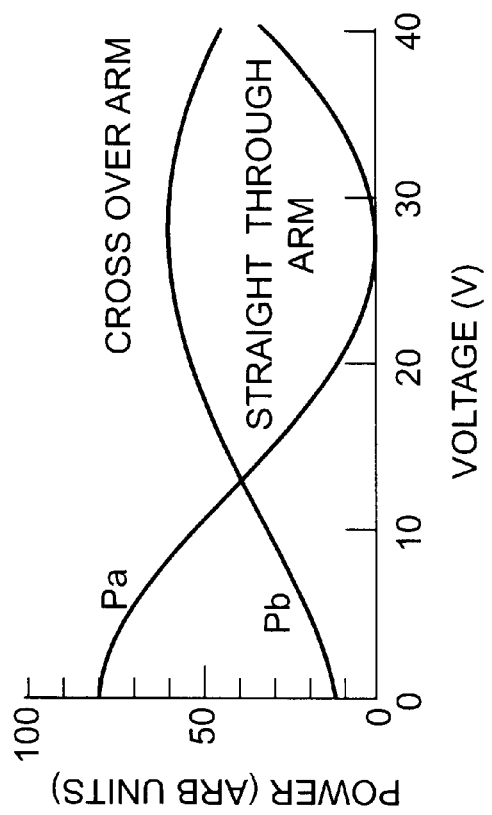
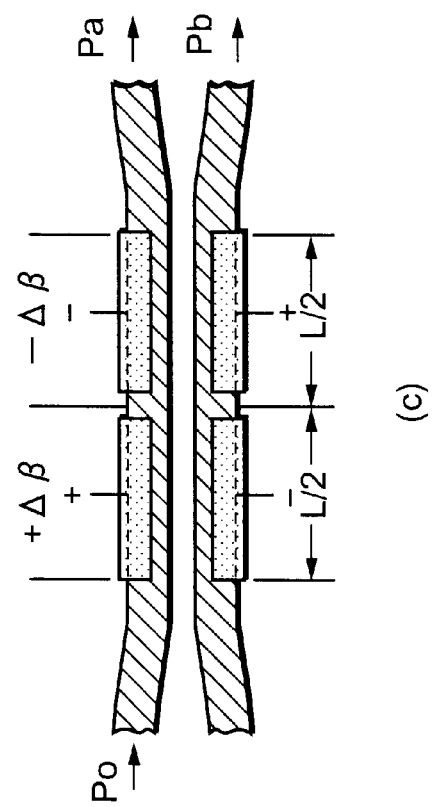
Fig.20

OPTICAL AMPLIFIER, METHOD FOR OPTICAL AMPLIFICATION AND OPTICAL TRANSMISSION SYSTEM

BACKGROUND OF THE INVENTION

1. Field of the Invention

The present invention relates to an optical amplifier, a method for optical amplification and an optical transmission system to be used in optical communication or optical information processing. In particular, the invention relates to an optical amplifier, and a method for optical amplification for generating forward and backward pumping light components from a pumping source and an optical transmission system using the optical amplifier.

2. Description of Related Art

In a long distance optical communication system, a method to place an optical amplifier on an optical fiber transmission line is generally introduced as one of the means to provide communication for longer transmission distance. In an optical distribution system for distributing optical signal to a number of points, the optical amplifier is now widely used to compensate distribution loss.

Conventionally, as an optical amplifier for directly amplifying the optical signal, an optical fiber amplifier and a semiconductor optical amplifier has been known. The optical fiber amplifier uses rare-earth doped optical fiber in the core as an amplification medium. The semiconductor optical amplifier is based on stimulated emission phenomenon within in semiconductor. At present, the optical fiber amplifier is generally used as the optical amplifier for commercial purpose.

There have been proposed various types of arrangement as optical fiber amplifier. In one of the examples of the arrangement, pumping light is propagated in two directions, i.e. forward and backward directions, in an erbium-doped optical fiber ("EDF"), which serves as an optical amplification medium. In this arrangement, two sets of laser diodes are used for forward pumping and backward pumping respectively.

In general, when intensity of forward pumping light is increased, noise characteristics of the output signal of EDF are improved. Also, when intensity of backward pumping light is increased, output power of EDF can be increased. For this reason, in this optical amplifier, it is possible to achieve optimal noise characteristics and optimal output power to match the desired operating conditions by separately controlling forward pumping light intensity and backward pumping light intensity.

In the optical amplifier, the pumping light source is one of the most expensive components. For this reason, it is desirable to design the system in compact size and also to design the pumping sources as a single unit for the purpose of providing the system in compact size and to reduce the cost of the system. That is, it is desirable to use the forward pumping source and the backward pumping source commonly as a single unit.

In case pumping is performed in forward and backward directions using a single pumping light source, the pumping light outputted from the pumping source is divided by an optical coupler such as an optical directional coupler. One of the divided pumping light components is used as forward pumping light, and the other is used as backward pumping light, and these are inputted to EDF.

In case the range of the level of input signal light is extensive or in case an optical amplifier is used in an optical repeater transmission system using wavelength division multiplexing, the required noise characteristics and output power vary according to the number of input channels, wavelength of input channel, input signal intensity and output signal intensity as required. As a result, optimal forward pumping light intensity and optimal backward pumping light intensity are different.

However, in an optical amplifier using a single pumping source by dividing it, intensity ratio of the forward pumping light to the backward pumping light is fixed to a value determined in the designing stage. For this reason, in an optical amplifier using a single pumping light source, it is difficult to control in such manner that optimal forward pumping light intensity and optimal backward pumping light intensity can be obtained at the same time. In this respect, it has been difficult in the past to obtain optimal noise characteristics and optimal output characteristics at the same time to match input/output conditions by a single pumping source.

For instance, in an optical amplifier for wavelength division multiplex transmission, the required output optical power varies extensively. Specifically, in case a signal of maximum number of channels is inputted, high output power corresponding to total sum of light signal intensity of all channels is required for the amplification medium. For this purpose, it is necessary not only to increase output of the pumping source at the time to input maximum number of channels, but also to design the ratio of the backward pumping light (when the pumping light is divided to backward pumping light and forward pumping light) to a higher value to match the maximum number of channels in the designing stage.

On the other hand, in case a signal containing minimum number of channels is inputted, high output power is not required for the amplification medium. For this reason, backward pumping light output intensity of the pumping source is decreased in order to have lower intensity of the backward pumping light. As a result, the intensity of the forward pumping light initially having a low dividing ratio is further decreased. Thus, noise characteristics of the output signal become deteriorated.

SUMMARY OF THE INVENTION

It is an object of the present invention to provide an optical amplifier, by which it is possible to obtain optimal noise characteristics and optimal output characteristics to match input/output conditions using a single pumping source.

The optical amplifier according to the present invention comprises a pumping source for outputting a pumping light, a first optical dividing device for dividing said pumping light to a first and a second divided pumping light components, an amplification medium, to which said first and said second pumping light components are inputted, and a dividing ratio regulator for regulating power ratio of said first and said second divided pumping light components.

The method for optical amplification of the present invention comprises an optical dividing process for dividing a single pumping light at a given ratio to generate a first and a second divided pumping light components, and pumping light injection process for injecting said first and said second divided pumping light components to an amplification medium.

The optical transmission system of the present invention comprises an optical transmitter for converting a signal to be transmitted and for transmitting said signal, a transmission line optical fiber for transmitting said optical signal, at least one optical amplifier arranged in said transmission line optical fiber, and an optical receiver for converting output light from said transmission line optical fiber to an electric signal and for outputting said signal, whereby the optical amplifier comprises the optical amplifier as described above.

BRIEF DESCRIPTION OF THE DRAWINGS

The above and other objects, features and advantages of the present invention will become more apparent from the following detailed description when taken in conjunction with the accompanying drawings wherein:

FIG. 20 is a diagram showing an arrangement of a directional coupler type optical switch.

DETAILED DESCRIPTION OF THE PREFERRED EMBODIMENTS

First, before describing the optical amplifier of the present invention, description will be given below on a conventional type optical amplifier for easier understanding of the invention.

Figure 1:
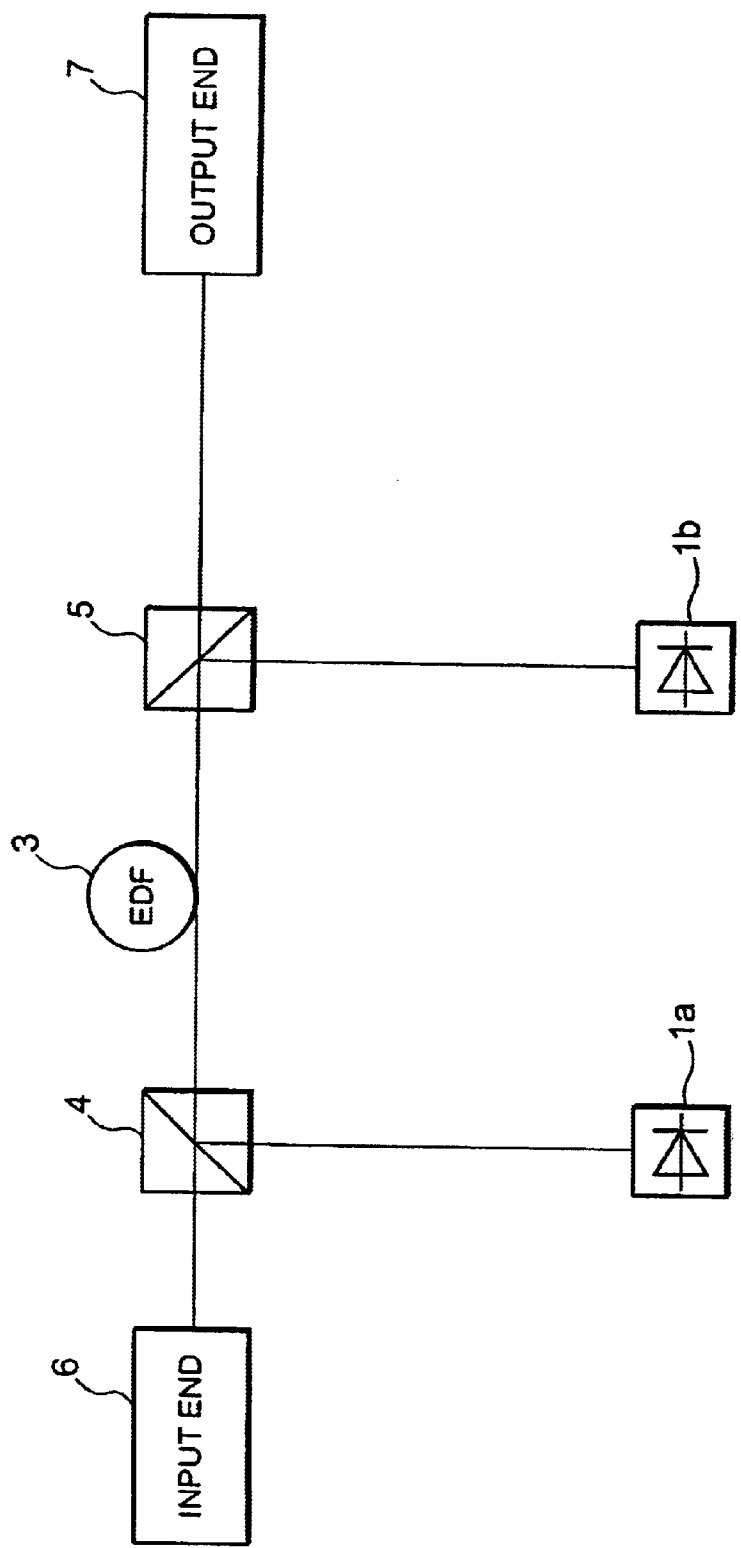
FIG. 1 is a block diagram showing an example of arrangement of a conventional type optical direct amplifier.

FIG. 1 shows an example of arrangement of a conventional type optical amplifier.

Referring to FIG. 1, description will be given on an example of a conventional type optical amplifier. In the convention type optical amplifier, an erbium-doped optical fiber (EDF) 3, serving as an optical amplification medium, is provided between an input end 6 and an output end 7. Further, there is provided a first laser diode 1a, which serves as a light source of forward pumping light to be injected from the input end 6 to the erbium-doped optical fiber 3. Also, there is provided a second laser diode 1b, serving as a light source of backward pumping light to be injected from the output end 7 to the erbium-doped optical fiber 3.

Also, a first coupler 4 is arranged between the input end 6 and the EDF 3. The forward pumping light outputted from the first laser diode 1a is multiplexed on an input signal from the input end 6 by the first coupler 4. The multiplexed forward pumping light is inputted to the EDF 3 and excites a fiber amplifier 3.

Also, a second coupler 5 is arranged between the output end 7 and the EDF 3. By the second coupler 5, the backward pumping light outputted from the second laser diode 1b is inputted to the EDF 3 and excites the EDF 3. An amplification signal outputted from the EDF 3 is outputted to the output end 7 via the second coupler 5.

In general, when intensity of the forward pumping light is increased, noise characteristics of the output signal of the EDF 3 is improved. Also, when intensity of the backward pumping light is increased, output power of the EDF 3 can be increased. In this respect, in the conventional type optical amplifier, by separately controlling output of the first laser diode 1a (forward pumping light intensity) and output of the second laser diode 1b (backward pumping light intensity), it is possible to achieve optimal noise characteristics and optimal output power to match the anticipated operating conditions.

Figure 2:
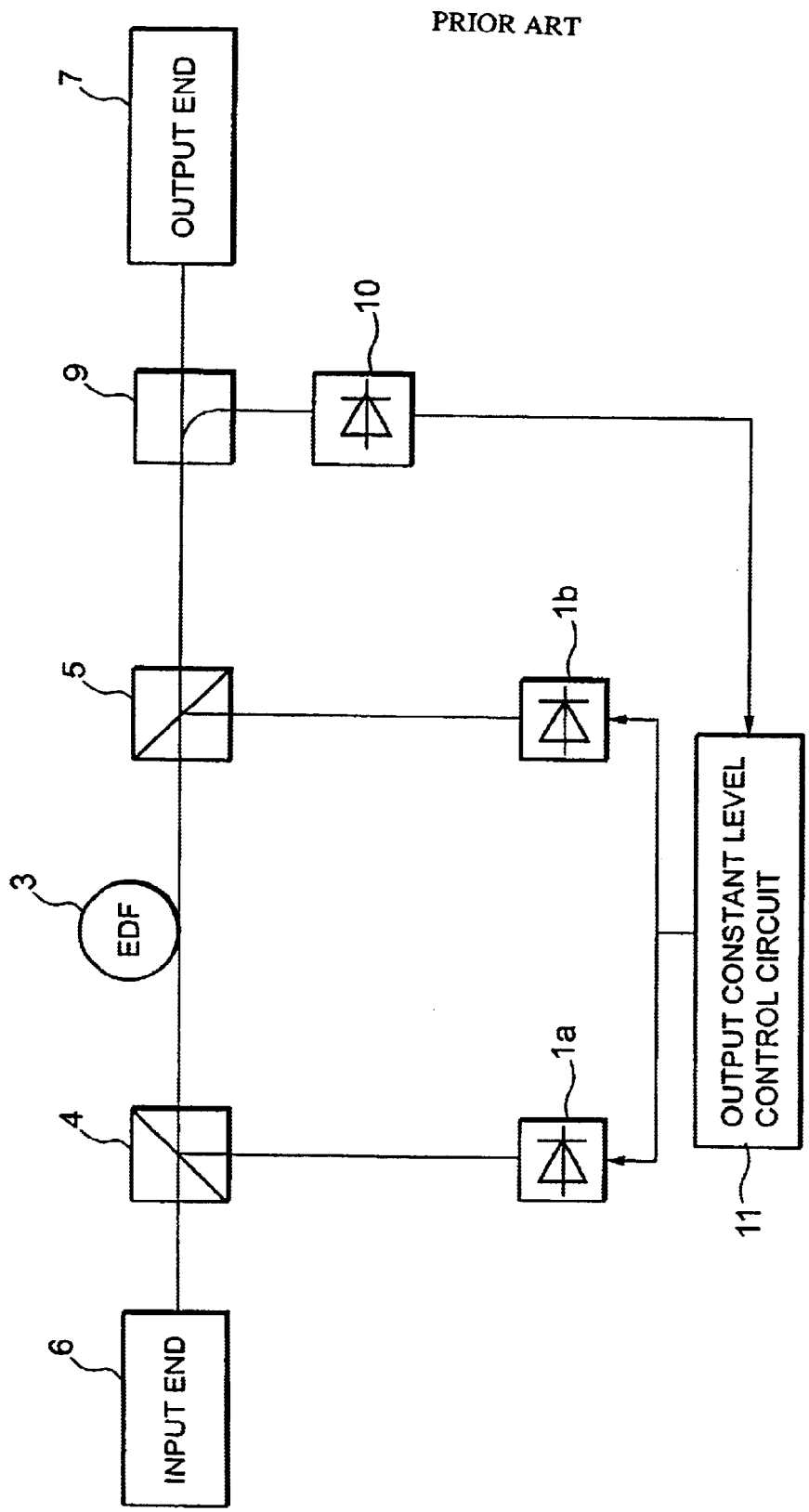
FIG. 2 is a block diagram showing another example of arrangement of a conventional type optical direct amplifier.

Next, FIG. 2 shows an example where an arrangement that output light intensity of the EDF 3 is fed back to the pumping sources 1a and 1b is added to the example shown in FIG. 1. In the example shown in FIG. 2, an optical coupler 9 is provided between the second coupler 5 and the output end 7. Intensity of the output light branched off by the optical coupler 9 is detected by a photodetector 10. Based on the result of detection, output of each of the first laser diode 1a and the second laser diode 1b, serving as pumping sources, is controlled by the output constant level control circuit 11 in such manner that output light intensity of the EDF 3 is at constant level.

In the optical amplifier, the pumping light source is one of the most expensive components. For this reason, it is desirable to design the system in compact size and also to design the pumping sources as a single unit for the purpose of providing the system in compact size and to reduce the cost of the system. That is, it is desirable to use the forward pumping source and the backward pumping source commonly as a single unit.

Figure 3:
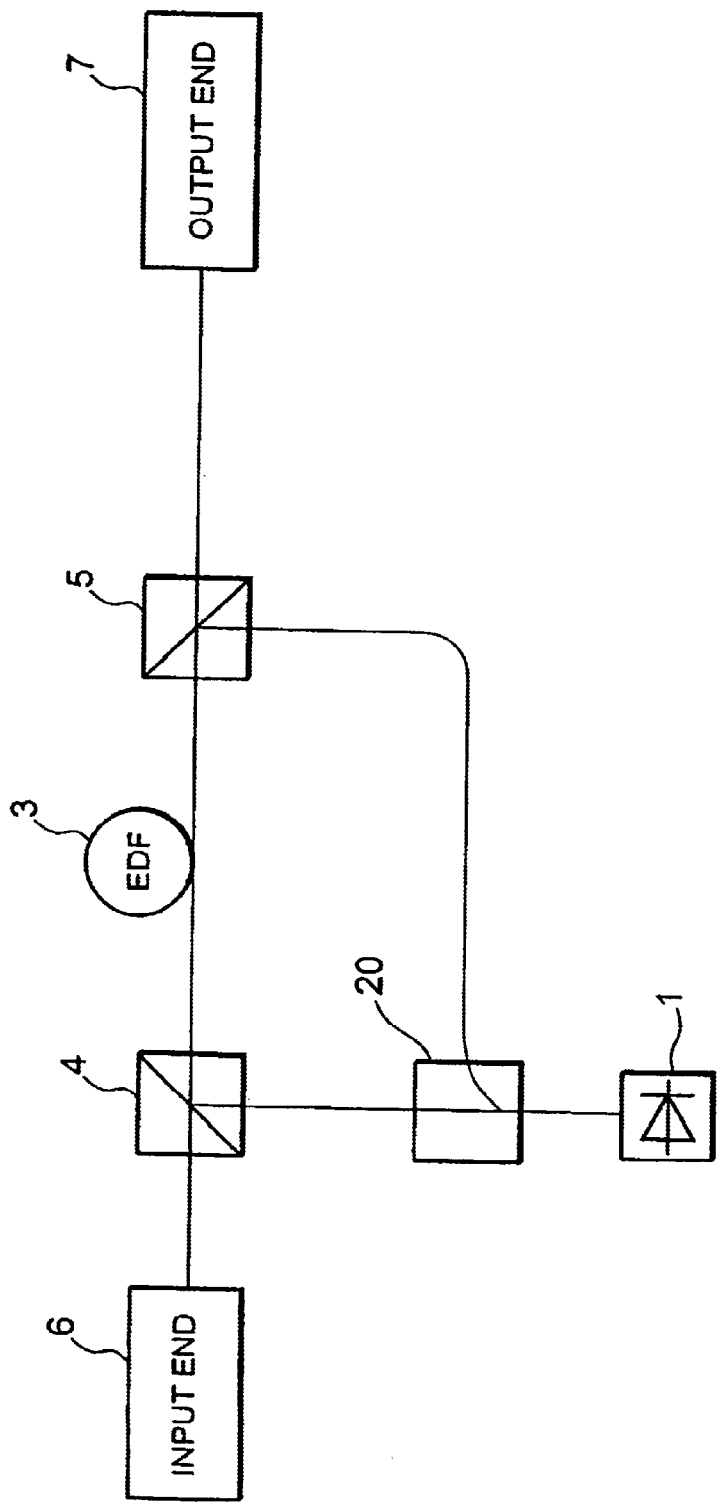
FIG. 3 is a block diagram showing an example of arrangement of a conventional type optical direct amplifier using a single pumping source.
Figure 4:
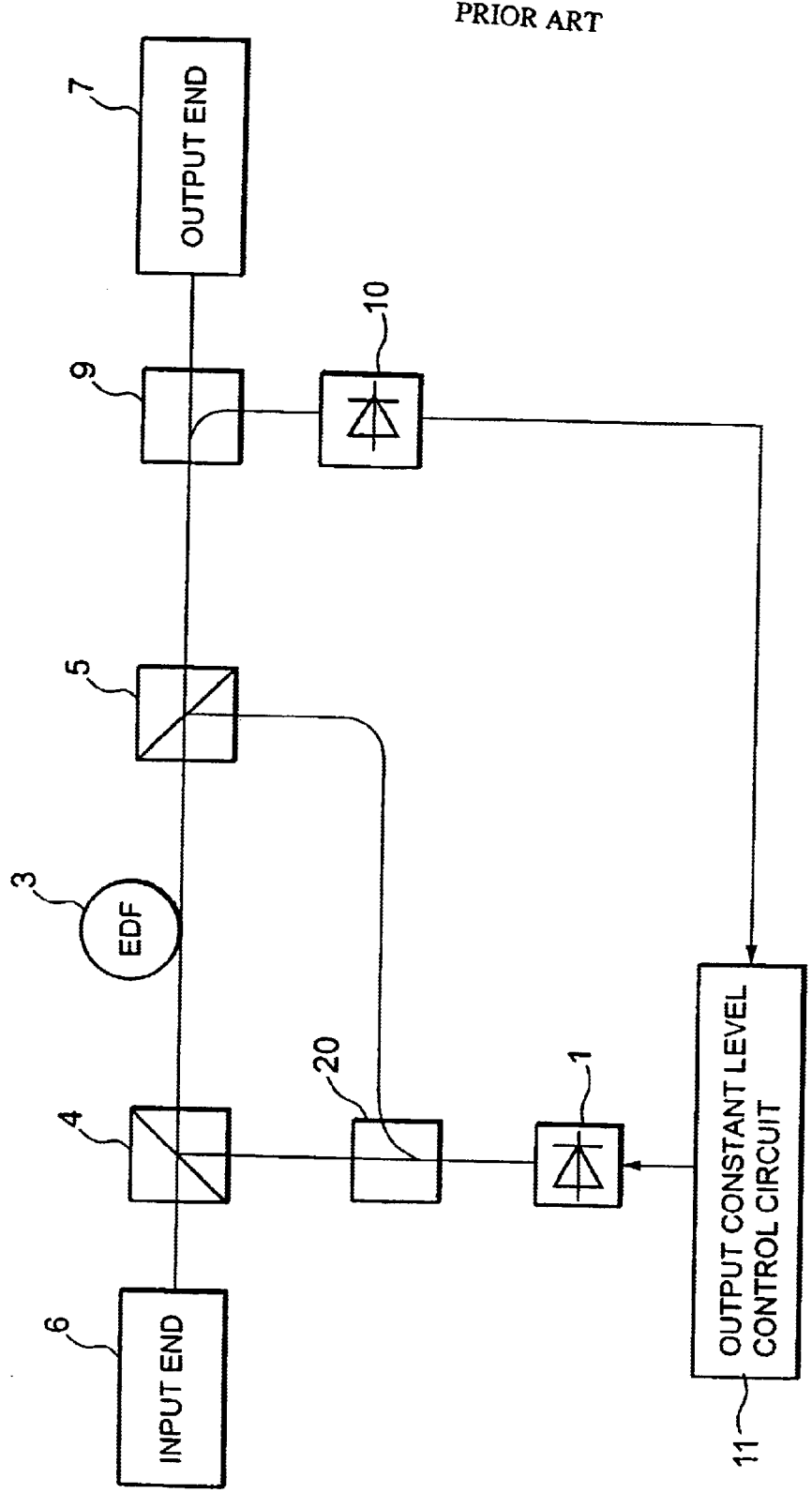
FIG. 4 is a block diagram showing another example of arrangement of a conventional type optical direct amplifier using a single pumping source.

FIG. 3 shows an arrangement where the conventional optical amplifier as shown in FIG. 1 is designed to have a single pumping source. FIG. 4 shows an example of arrangement where the conventional optical amplifier shown in FIG. 2 is designed to have the pumping sources as a single unit.

In each of the optical amplifiers shown in FIG. 3 and FIG. 4, pumping light outputted from the laser diode 1, acting as a pumping source, is divided by the optical coupler 20 such as an optical directional coupler. One of the divided pumping light components is used as the forward pumping light, and the other is used as the backward pumping light, and these are inputted to the EDF 3 respectively.

In case the range of the level of inputted signal light is extensive or in case the optical amplifier is used in light repeater transmission system using wavelength division multiplexing, the required noise characteristics and the output power are different according to number of input channels, wavelength of input channels, input signal intensity or output signal intensity. As a result, both the optimal forward pumping light intensity and the optimal backward pumping light intensity are different.

However, in the optical amplifier using single pumping source as shown in FIG. 3 and FIG. 4, intensity ratio of the forward pumping light to the backward pumping light is fixed to a value determined in the designing stage. For this reason, in these types of optical amplifiers with single pumping sources, it is difficult to control in such manner that the optimal forward pumping light intensity and the optimal backward pumping light intensity are both satisfied to match the changes of input/output conditions. In this respect, it has been difficult in the past to obtain optimal noise characteristics and optimal output characteristics at the same time to match the input/output conditions by the single pumping source.

For instance, in the optical amplifier for wavelength division multiplex transmission, the required output optical power varies extensively. Specifically, in case a signal of maximum number of channels is inputted, the amplification medium must have high output power to correspond to total sum of optical signal intensity of all channels. For this purpose, it is necessary not only to increase the output of pumping source at the time of input of the maximum number of channels, but also that ratio of the backward pumping light (when pumping light is divided to backward pumping light and forward pumping light) is to be designed to a higher value to match the maximum number of channels in the designing stage.

On the other hand, in case a signal containing the minimum number of channels is inputted, high output power is not required for the amplification medium. As a result, the intensity of the backward pumping light is decreased, and output intensity of the pumping source is reduced. Thus, the intensity of the forward pumping light initially having lower dividing ratio is further decreased. Therefore, noise characteristics of the output signal are deteriorated.

To solve the above problems, it is an object of the present invention to provide an optical amplifier, by which it is possible to obtain optimal noise characteristics and optimal output characteristics to match the changes of input/output conditions by the use of a single pumping source.

In the following, description will be given on embodiments of the optical amplifier of the present invention and a method for controlling the optical amplifier referring to the drawings.

[1st Embodiment]

First, referring to FIG. 5, description will be given on an arrangement of an optical amplifier of a first embodiment of the invention.

Figure 5:
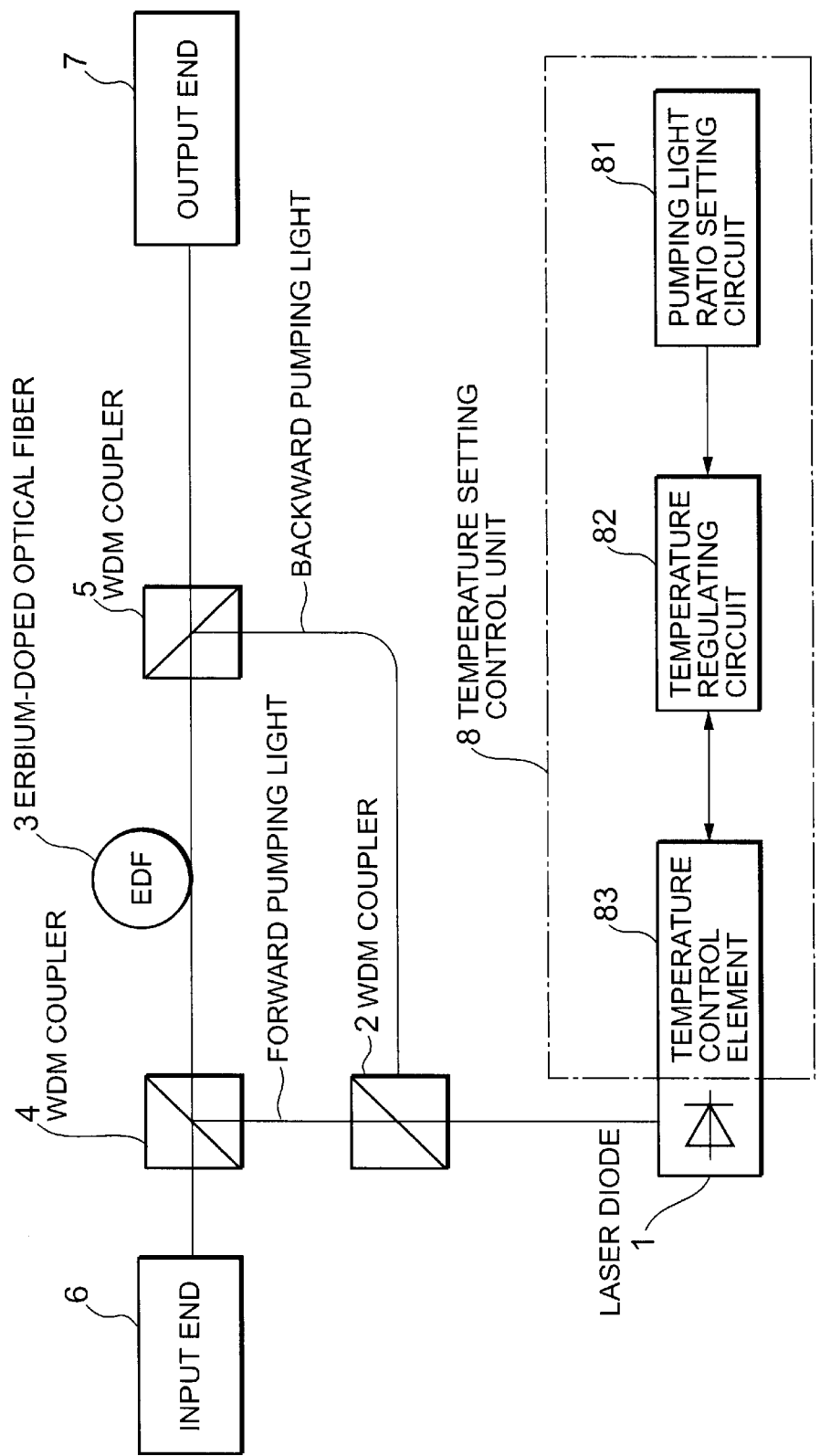
FIG. 5 is a block diagram showing an arrangement of an optical direct amplifier of a first embodiment of the present invention.

As shown in FIG. 5, the optical amplifier of the first embodiment of the present invention comprises a laser diode 1, serving as a laser light source, and a wavelength division multiplex coupler (WDM coupler), serving as a wavelength dividing means, for dividing the pumping light outputted from the laser diode 1 at a certain wavelength and for separately outputting long wavelength component light and short wavelength component light.

Figure 6:
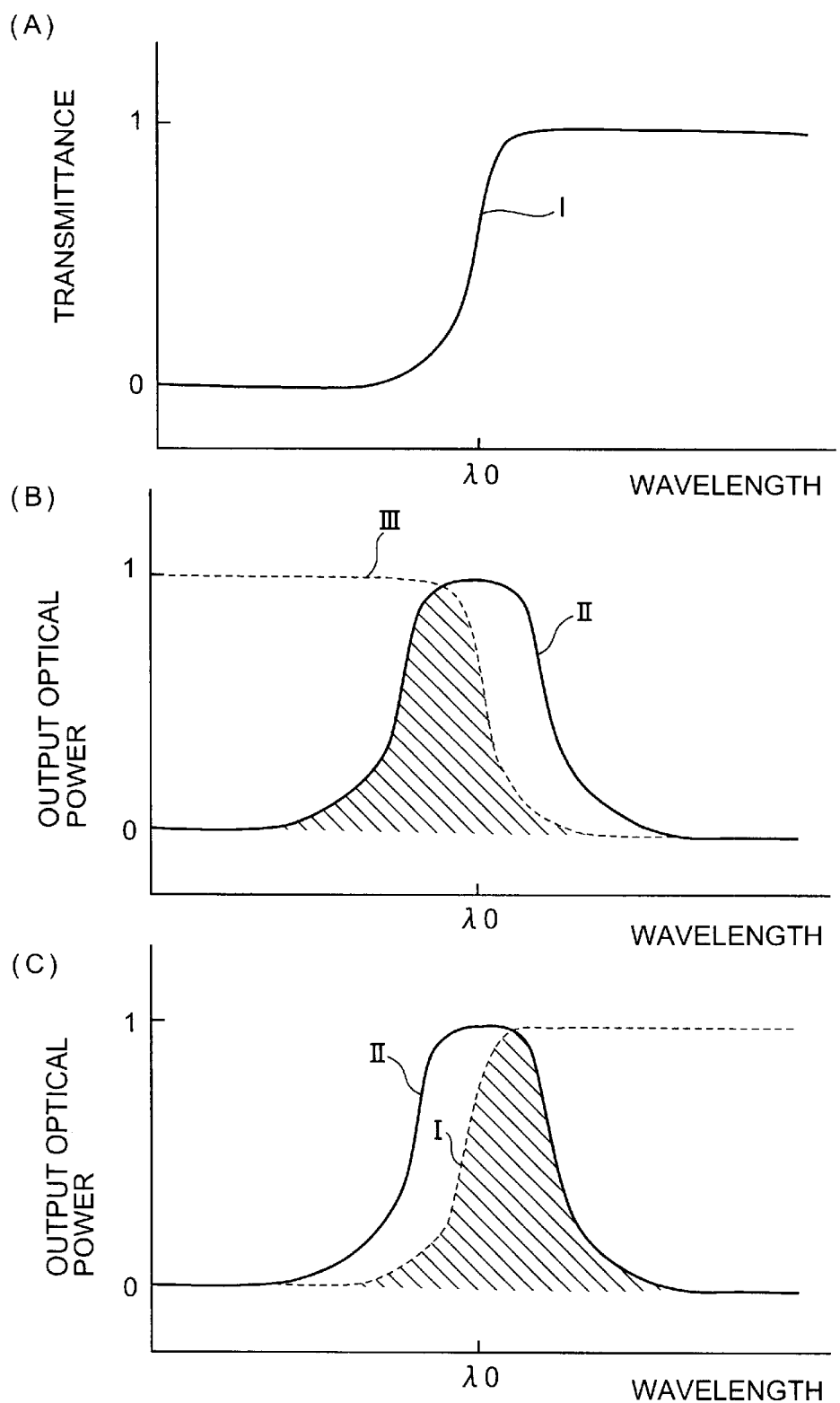
FIG. 6(A) is a graph showing transmission characteristics of a wavelength division multiplex coupler.
FIG. 6(B) is a graph showing short wavelength component of pumping light.
FIG. 6(C) is a graph of long wavelength component of pumping light.

Here, referring to FIG. 6, description will be given on how the pumping light outputted from the laser diode is divided to long wavelength component and short wavelength component by the WDM coupler 2.

FIG. 6(A) shows transmission characteristics of the WDM coupler 2. A curve I shown in FIG. 6(A) represents transmittance wavelength characteristics of one of two output ends of the WDM coupler 2. As shown by the curve I, transmittance of the WDM coupler 2 is lower on short wavelength side and higher in long wavelength side with a boundary near the wavelength of $\lambda 0$.

The transmittance of the other of the two output ends of the WDM coupler 2 is in reverse phase to the curve I.

Next, referring to FIG. 6(B), description will be given on the short wavelength component.

In FIG. 6(B), a curve II represents a power spectrum of pumping light inputted to the WDM coupler 2. A broken line III represents wavelength characteristics of transmittance of the output end of the WDM coupler 2. A shaded portion where the curve II is superimposed on the broken line III, i.e. a portion where transmittance at the other output end of the WDM coupler 2 is higher among the power spectra of the pumping light, represents power spectrum of the short wavelength component light.

Next, referring to FIG. 6(C), long wavelength component will be described.

In FIG. 6(C), the curve II represents a power spectrum of the pumping light inputted to the WDM coupler 2. A broken line I represents wavelength characteristics of transmittance of one of the output ends of the WDM coupler 2. A shaded portion where the curve II is superimposed on the broken line I, i.e. a portion where transmittance at one of the output ends of the WDM coupler 2 is higher among the power spectra of the pumping light, represents power spectrum of the long wavelength component light.

The optical amplifier of the present embodiment comprises an EDF 3 as an amplification medium between the input end 6 and the output end 7. Further, a WDM coupler 4 is placed between the input end 6 and the EDF 3, and a WDM coupler 5 is arranged between the output end 7 and the EDF 3.

The long wavelength component light outputted from the WDM coupler 2 is multiplexed with a signal light inputted from the input end 6 at the WDM coupler 4 closer to the input end 6, and it is inputted to the EDF 3 as a forward pumping light. The short wavelength component light is inputted to the EDF 3 as a backward pumping light from the WDM coupler 5 closer to the output end 7. An amplification signal outputted from the EDF 3 passes through the WDM coupler 5 and is outputted from the output end 7.

Further, to correspond to the setting ratio of the forward pumping light intensity to the backward pumping light intensity, the optical amplifier comprises a temperature setting control unit 8 for controlling temperature of the laser diode 1. The temperature setting control unit 8 comprises a pumping light ratio setting circuit 81, a temperature regulating circuit 82, and a temperature control element 83.

The pumping light ratio setting circuit 81 sets the ratio of the forward pumping light intensity to the backward pumping light intensity. To correspond to the ratio set by the pumping light ratio setting circuit 81, the temperature regulating circuit 82 determines setting temperature of the laser diode. The setting temperature may be given as a function of the ratio of the forward pumping light to the backward pumping light, for instance, or it may be obtained from a reference table.

The temperature control element 83 controls the laser diode 1 so that it will be the setting temperature determined by the temperature regulating circuit 82.

The temperature control element 83 may comprise an electronic cooling means such as a peltier element, for instance.

Here, referring to FIG. 7, description will be given on the relationship between the temperature of the laser diode 1 and distribution of power spectrum of the pumping light.

Figure 7:
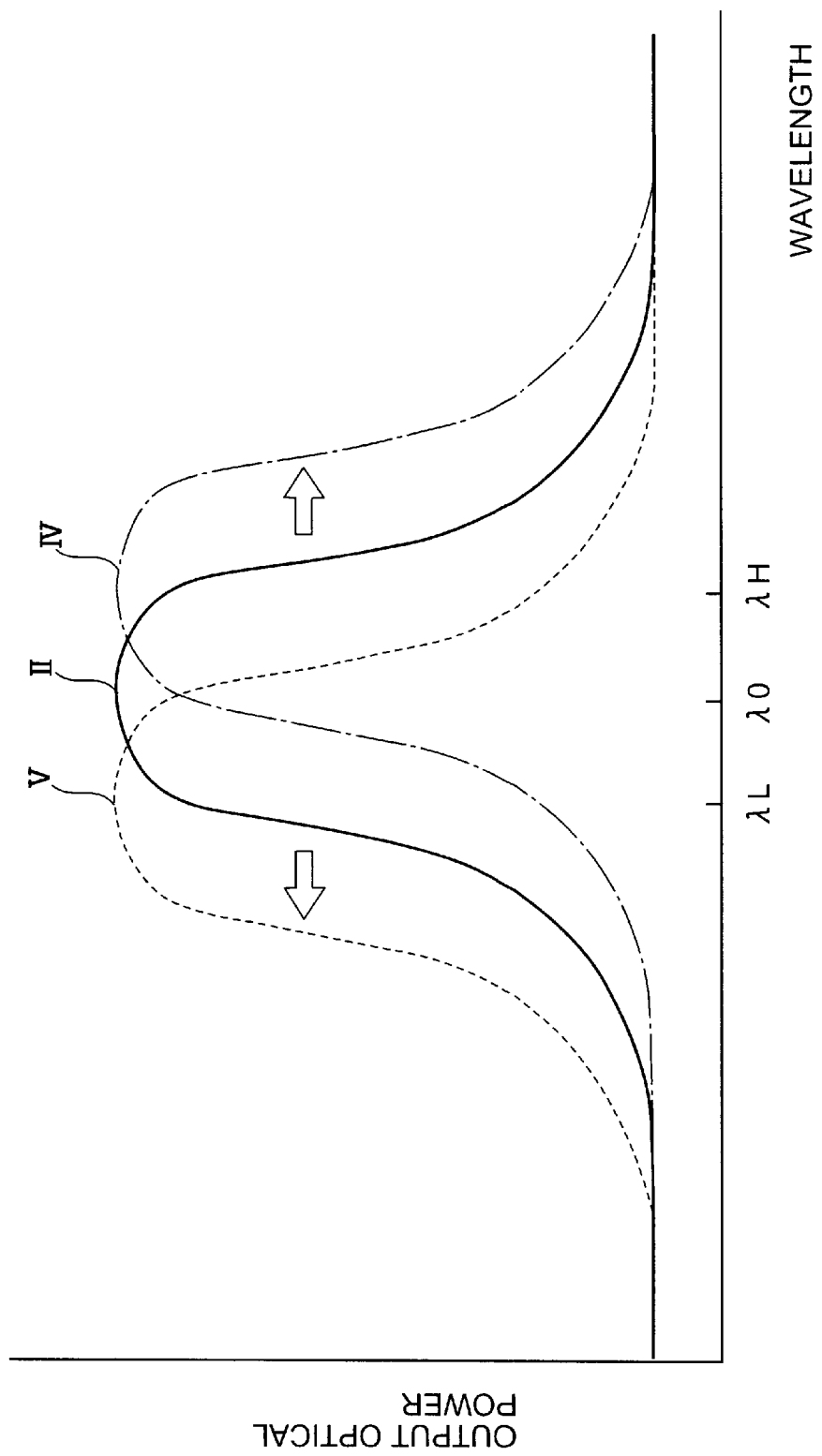
FIG. 7 represents a graph showing a shift due to temperature change in wavelength distribution of pumping light.

In the graph of FIG. 7, a curve II represents power spectrum of output light of the laser diode 1. The curve II is distributed with a peak at central wavelength of $\lambda 0$.

When the temperature of the laser diode 1 is increased by the temperature control element 83, power spectrum of the output light is shifted toward long wavelength side. In the graph of FIG. 7, a one-dot chain line IV represents the power spectrum with central wavelength shifted from $\lambda 0$ to $\lambda H$ on long wavelength side. Thus, when power spectrum of the pumping light is shifted toward the long wavelength side, the area of the shaded portion of the long wavelength component as shown in FIG. 6(C) is widened, and the ratio of the long wavelength component light is increased.

Therefore, the long wavelength component light is inputted to the EDF 3 as forward pumping light in the present embodiment, and the temperature of the laser diode 1 is increased. As a result, the ratio of the forward pumping light is increased, and the noise characteristics can be improved.

In contrast, when the temperature of the laser diode 1 is decreased, power spectrum of the output light is shifted toward the short wavelength side. In the graph of FIG. 7, a broken line V represents power spectrum, in which central wavelength is shifted from $\lambda 0$ to $\lambda L$ on short wavelength side. Thus, when power spectrum of the pumping light is shifted toward the short wavelength side, area of the shaded portion of the short wavelength component in FIG. 6(B) is widened, and the ratio of the short wavelength component light is increased.

Therefore, the short wavelength component light is inputted to the EDF 3 as the backward pumping light in the present embodiment. Thus, by decreasing the temperature of the laser diode 1, the ratio of the backward pumping light is increased, and output characteristics can be improved.

In this way, according to the present embodiment, the ratio of the long wavelength component light to the short wavelength component light is controlled to a desired value by controlling the temperature of the laser light source. As a result, it is possible to obtain optimal noise characteristics and optimal output characteristics to match the changes of input/output conditions by the use of a single pumping source.

[2nd Embodiment]

Figure 8:
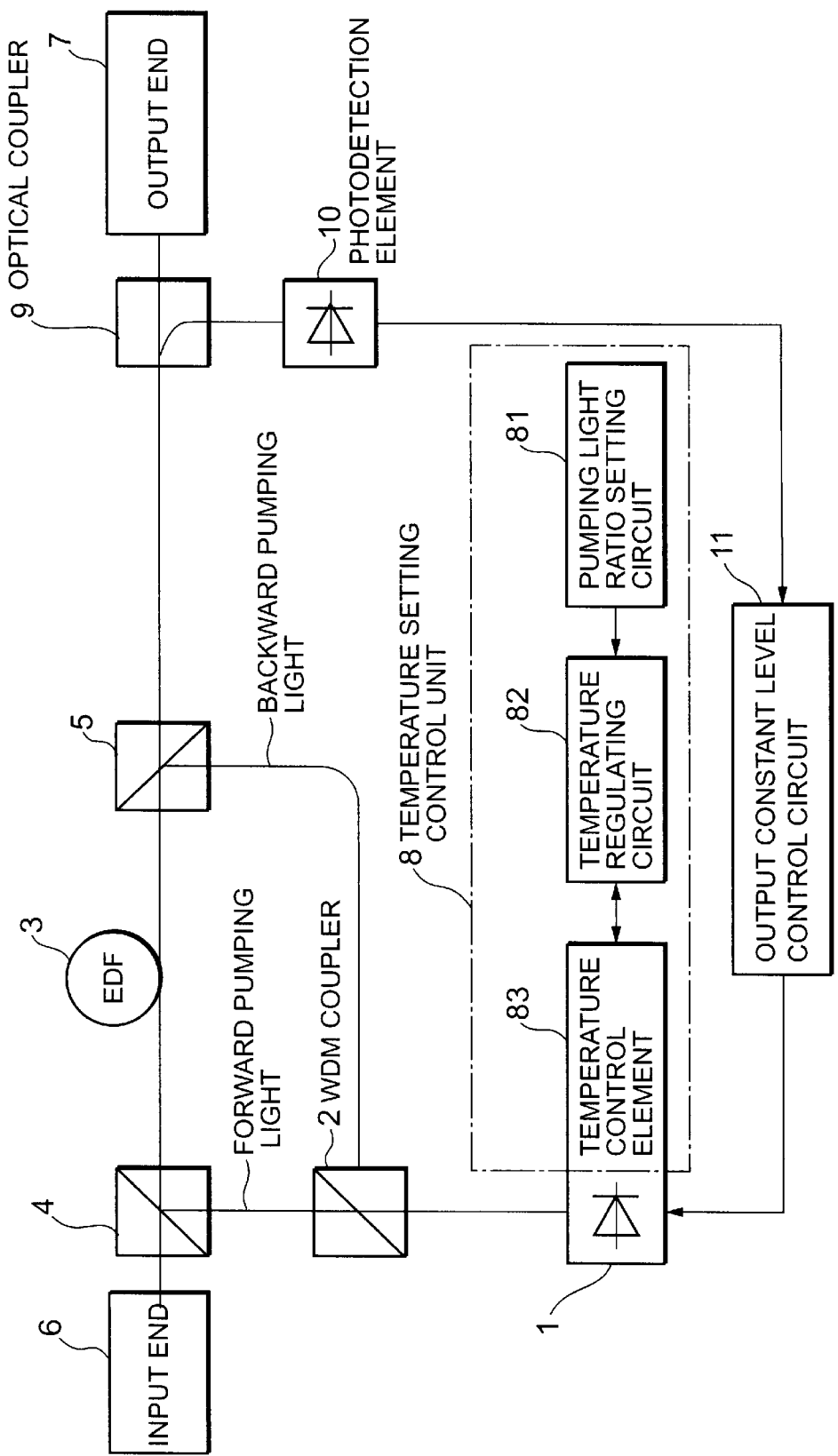
FIG. 8 is a block diagram showing an arrangement of an optical direct amplifier of a second embodiment of the present invention.

Next, referring to FIG. 8, description will be given on an arrangement of an optical direct amplifier of a second embodiment. The direct optical amplifier of the second embodiment comprises, in addition to the arrangement of the first embodiment as described above, an optical coupler 9 as dividing means, a photodiode 10 as a photodetector, and a circuit 11 for controlling the output to a constant level.

The optical coupler 9 branches off the optical output of an amplification signal outputted from the EDF 3 between the optical coupler 5 and the output end 7. The optical output branched off by the optical coupler 9 is detected by the photodiode 10. The output constant level control circuit 11 controls the output of the laser diode 1 by drive current so that optical output of the EDF 3 is kept on a constant level in response to the optical output detected by the photodiode 10.

As a result, according to the second embodiment, it is possible to obtain optimal noise characteristics and optimal output characteristics to match the changes of input/output conditions, and intensity of the output signal can be controlled on a constant level.

[3rd Embodiment]

Figure 9:
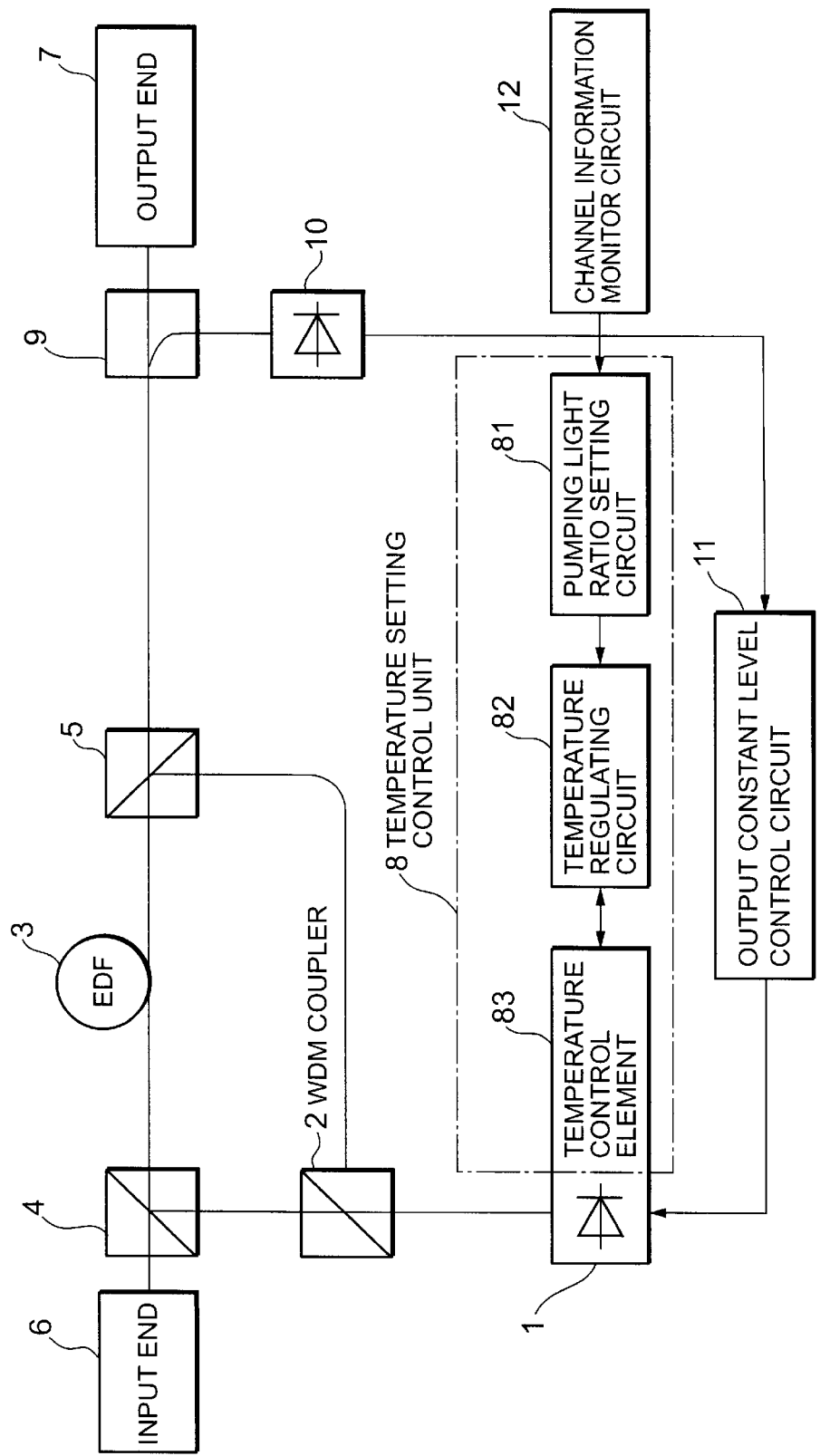
FIG. 9 is a block diagram showing an arrangement of an optical direct amplifier of a third embodiment of the present invention.

Next, referring to FIG. 9, description will be given on an arrangement of an optical direct amplifier of a third embodiment. The direct optical amplifier of the third embodiment comprises, in addition to the features of the second embodiment as described above, a channel information monitor circuit 12.

The channel information monitor circuit 12 monitors number of channels of a signal inputted from the input end 6 to the EDF 3. The pumping light ratio setting means of the temperature setting control unit 8 sets ratio of the forward pumping light intensity to the backward pumping light intensity to match the number of channels detected by the channel number monitor unit 12.

For instance, in case the number of channels detected by the channel information monitor circuit 12 is many, higher output optical power is required, and the ratio of the backward pumping light should be increased. On the other hand, if the number of channels is not many, higher output optical power is not required. Then, the ratio of the forward pumping light should be increased to reduce the noise characteristics.

[4th Embodiment]

Figure 10:
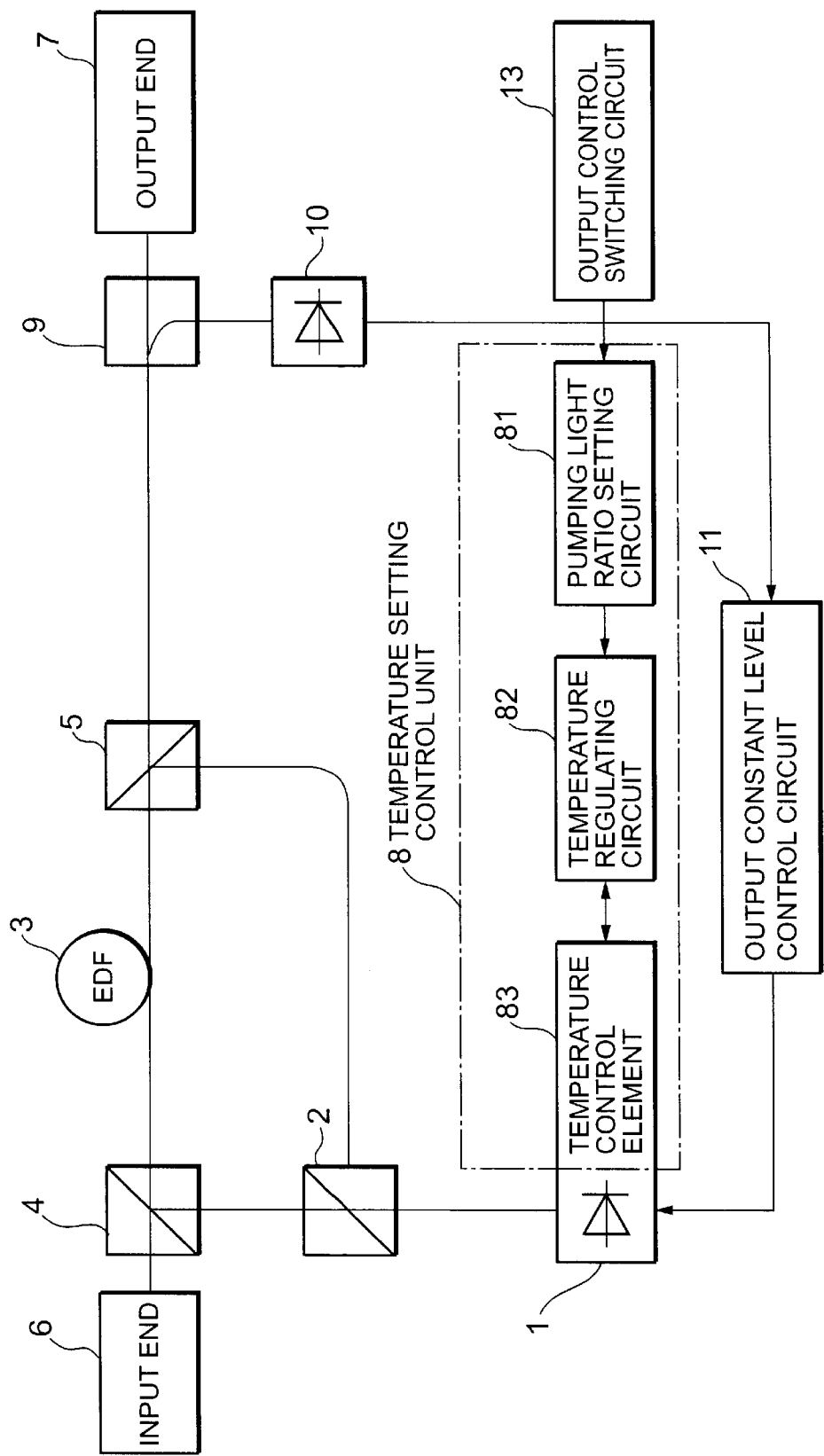
FIG. 10 is a block diagram showing an arrangement of an optical direct amplifier of a fourth embodiment of the present invention.
Figure 11:
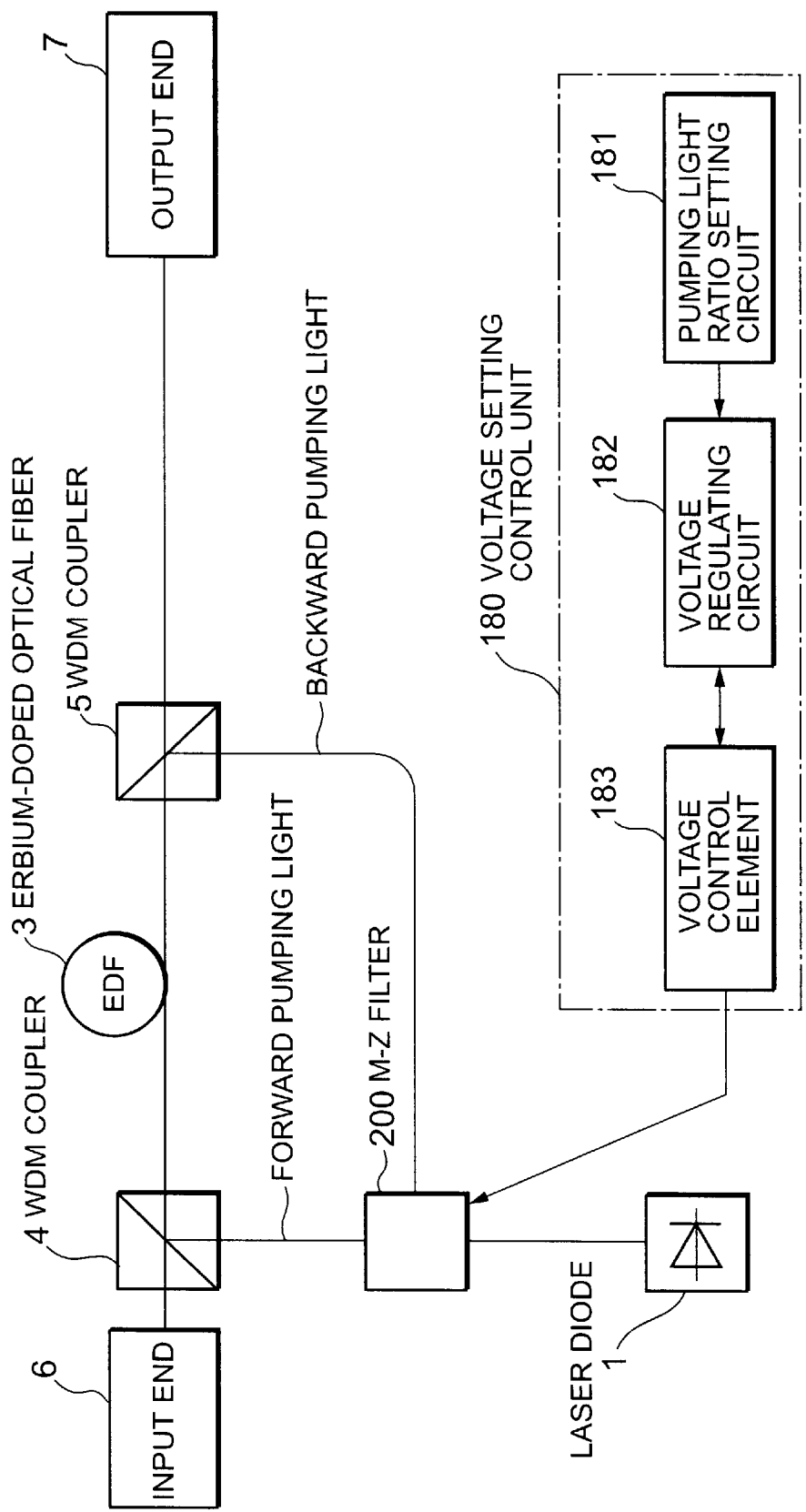
FIG. 11 is a block diagram showing an arrangement applying M-Z filter in the first embodiment.
Figure 12:
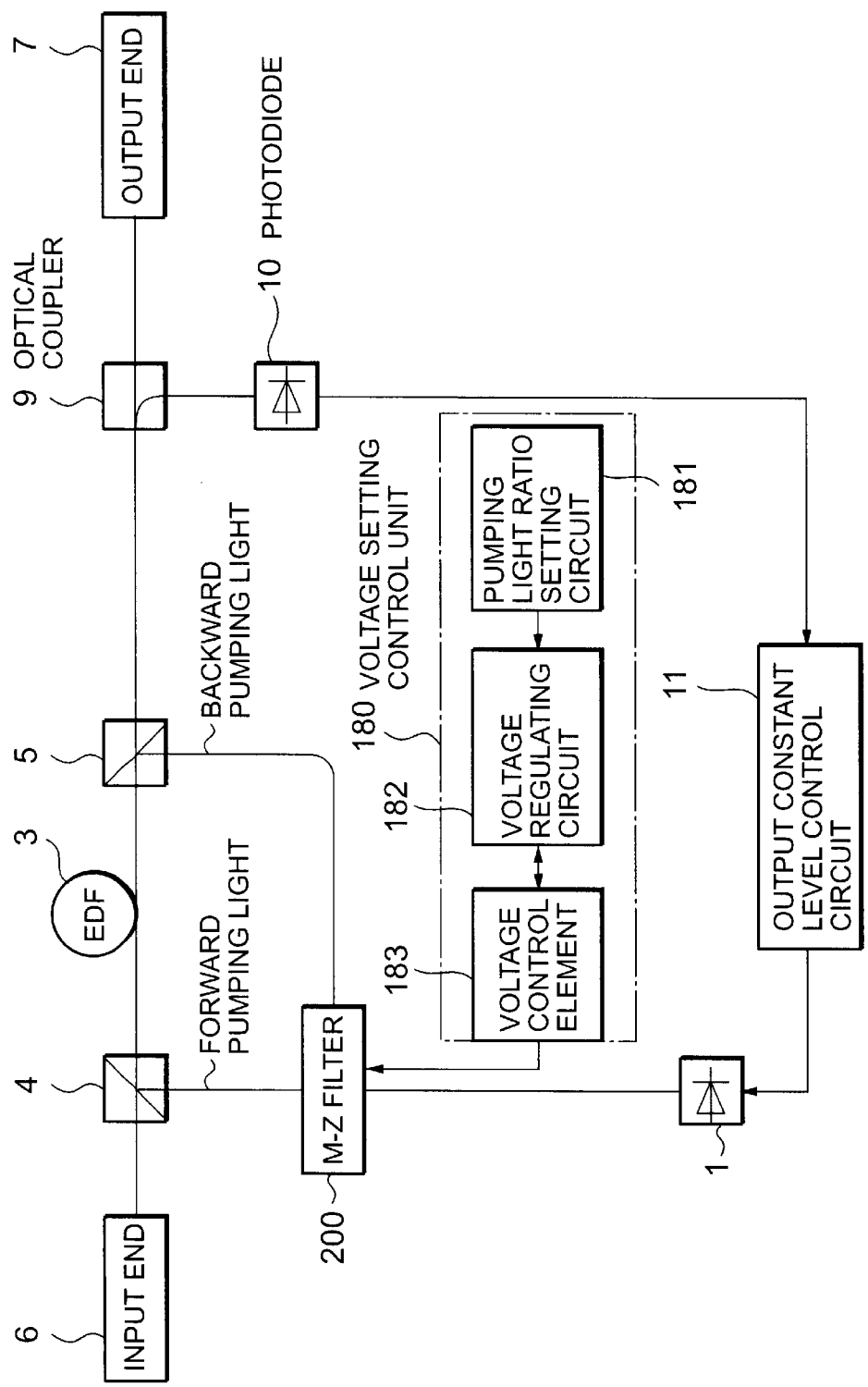
FIG. 12 is a block diagram showing an arrangement applying M-Z filter in the second embodiment.
Figure 13:
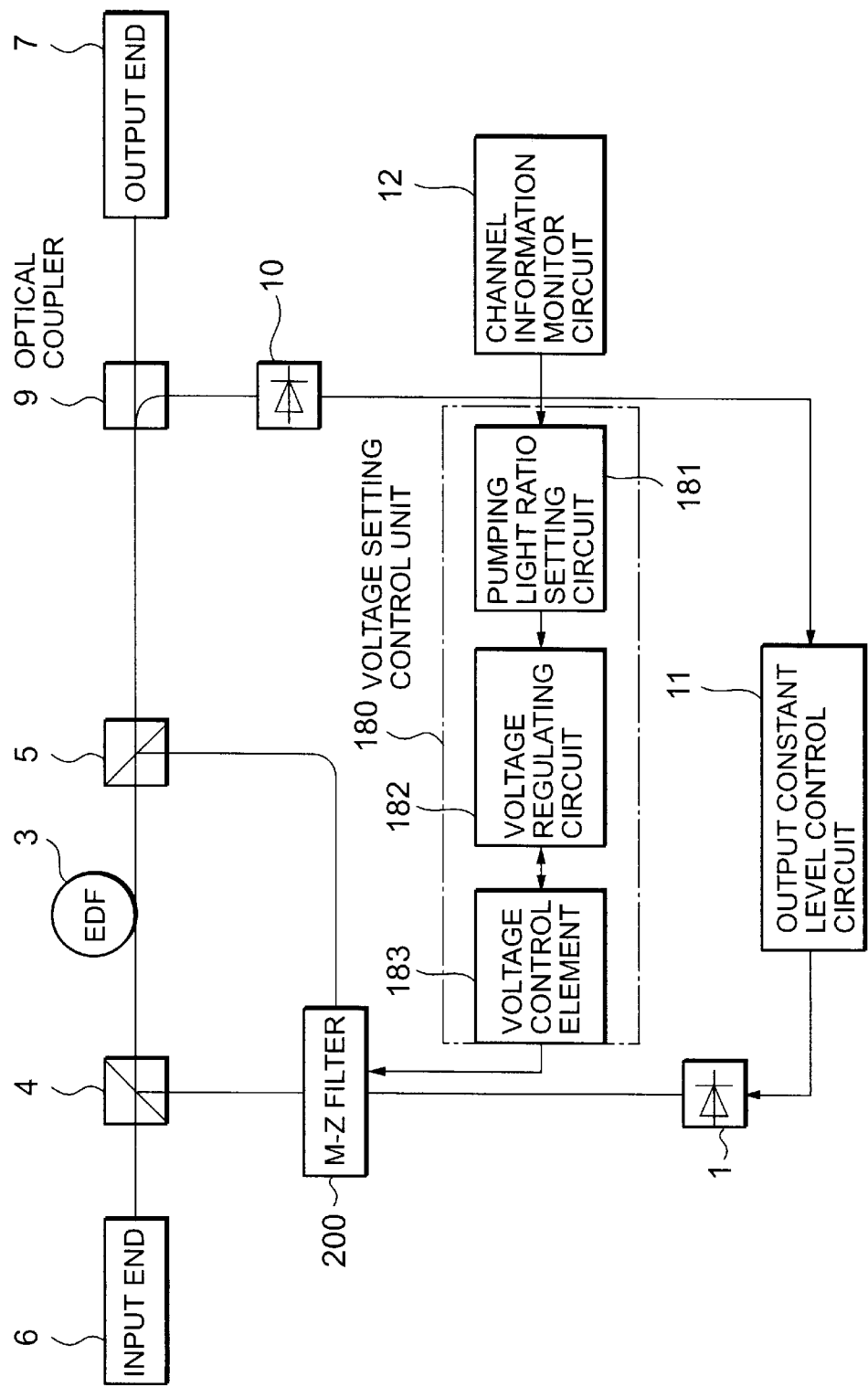
FIG. 13 is a block diagram showing an arrangement applying M-Z filter in the third embodiment.
Figure 14:
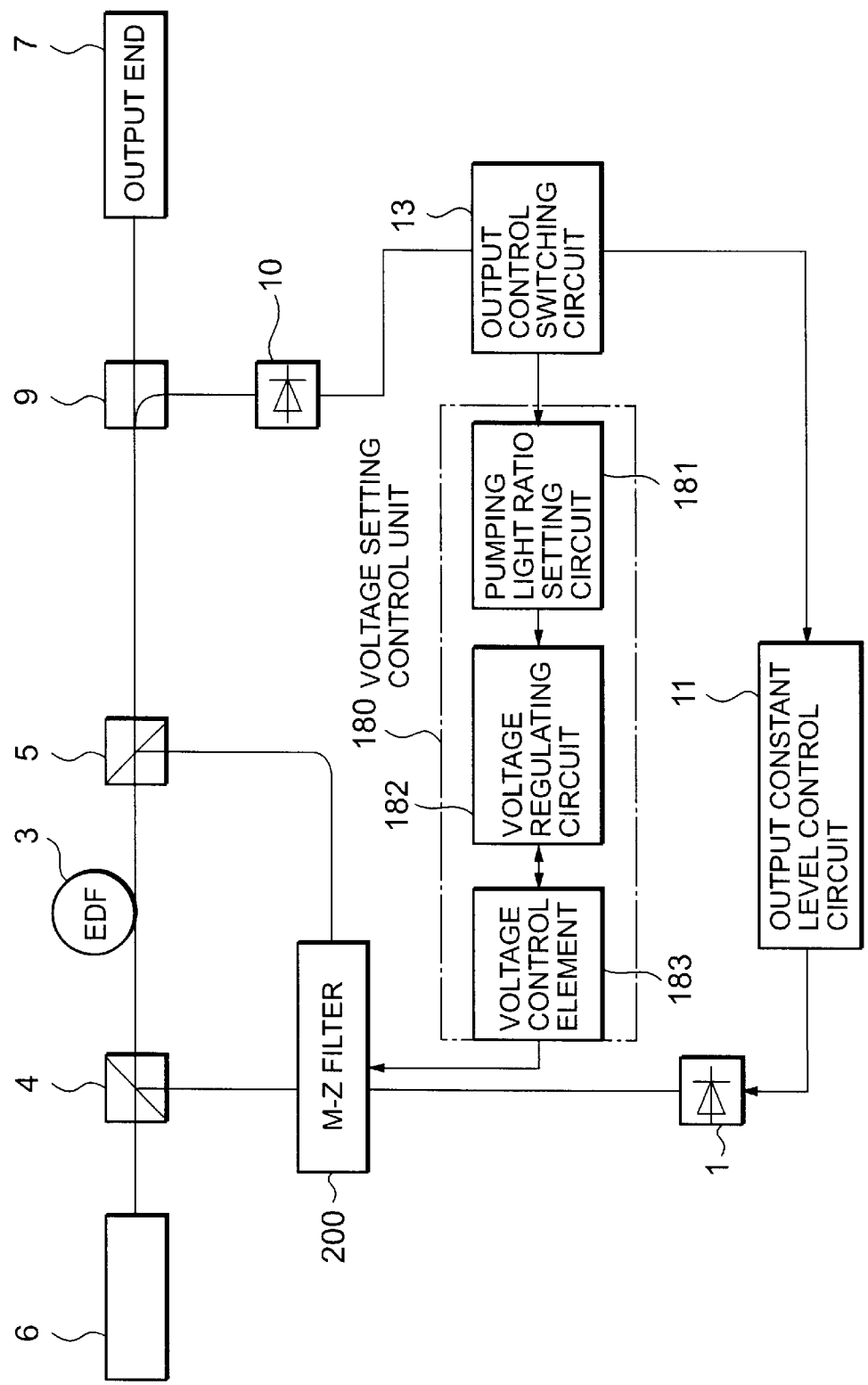
FIG. 14 is a block diagram showing an arrangement applying M-Z filter in the fourth embodiment.

Next, referring to FIG. 10, description will be given on the arrangement of an optical direct amplifier of a fourth embodiment. The direct optical amplifier of the fourth embodiment comprises, in addition to the features of the second embodiment as described above, an output control switching circuit 13.

When the ratio of the forward pumping light intensity or the backward pumping light intensity is turned to be lower than a certain value, the output control switching circuit 13 switches over the means for controlling the laser diode 1 from the setting temperature control unit 8 to the output control unit.

For instance, to increase the optical output power, the ratio of the backward pumping light is increased by temperature control. When the ratio of the forward pumping light is decreased to near 0, noise characteristics are deteriorated. Then, the output control switching circuit 13 switches over the means for controlling the laser diode 1 from the setting temperature control unit 8 to the output constant level control circuit 11. The output constant level control circuit 11 preferentially controls the output of the laser diode 1 by drive current, and it is possible to increase the output power without decreasing the ratio of the forward pumping light. As a result, it is possible to increase optical output power while maintaining noise characteristics on a constant level.

In the embodiments as described above, description has been given on examples under specific conditions, while various changes and modifications can be made to the present invention. For instance, in the embodiments as described above, description has been given on examples using laser diode as laser light source, while, in the present invention, the laser light source is not limited to laser diode. For instance, gas laser may be used as the laser light source. The gas laser is preferably used in case high output is required.

Also, in the above embodiments, description has been given on the examples where a wavelength division multiplex coupler (WDM coupler) is used as wavelength dividing means, while, in the present invention, wavelength dividing means is not limited to the WDM coupler. For instance, fiber Bragg grating may be used as the wavelength dividing means.

Further, in the embodiments described above, description has been given on examples where the long wavelength component light is used as the forward pumping light and the short wavelength component light is used as the backward pumping light, while, in the present invention, the short wavelength component light may be used as the forward pumping light and the long wavelength component light may be used as the backward pumping light.

Figure 15:
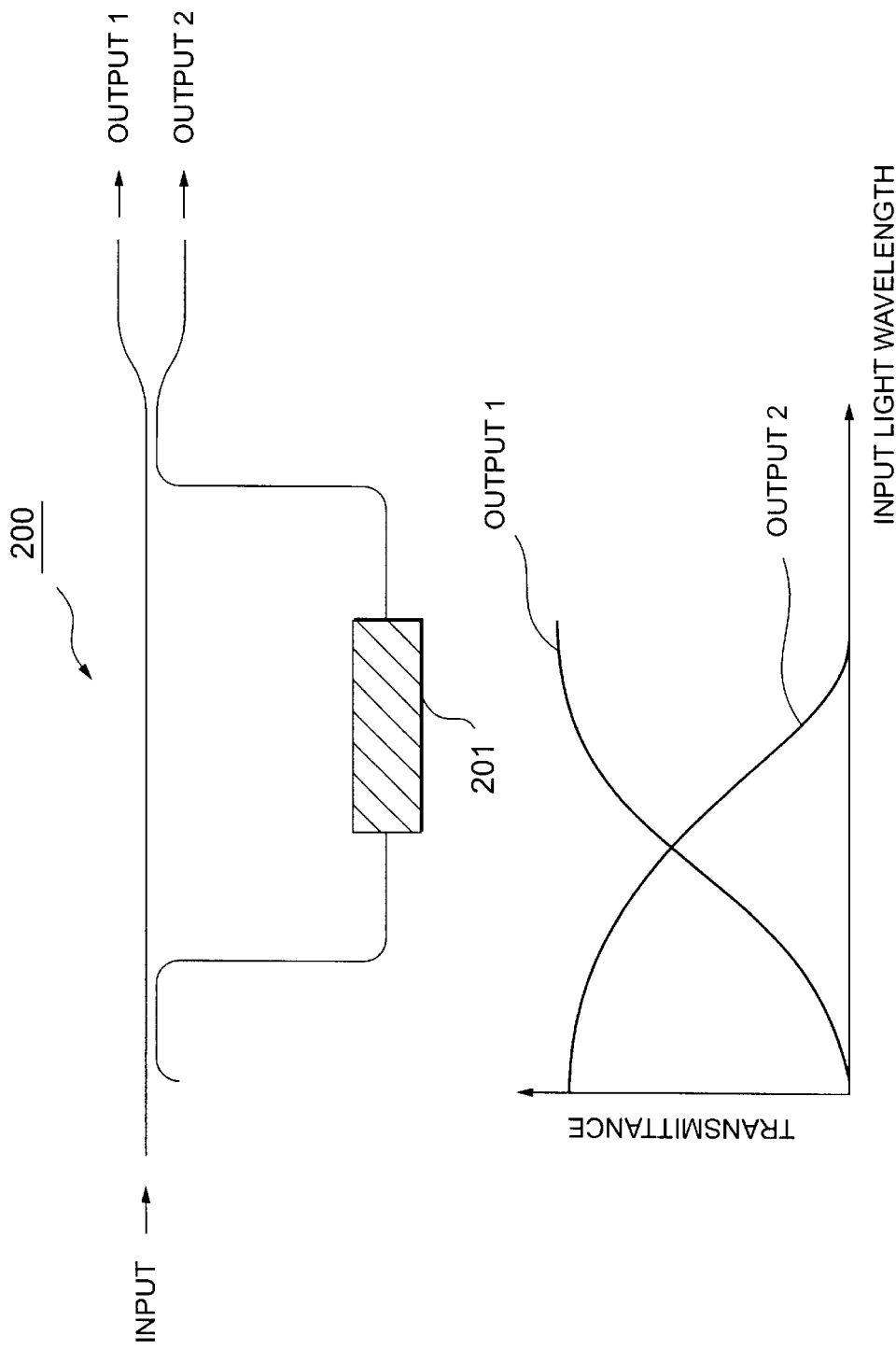
FIG. 15 is a diagram showing an arrangement and wavelength transmission characteristics of M-Z filter.
Figure 16:
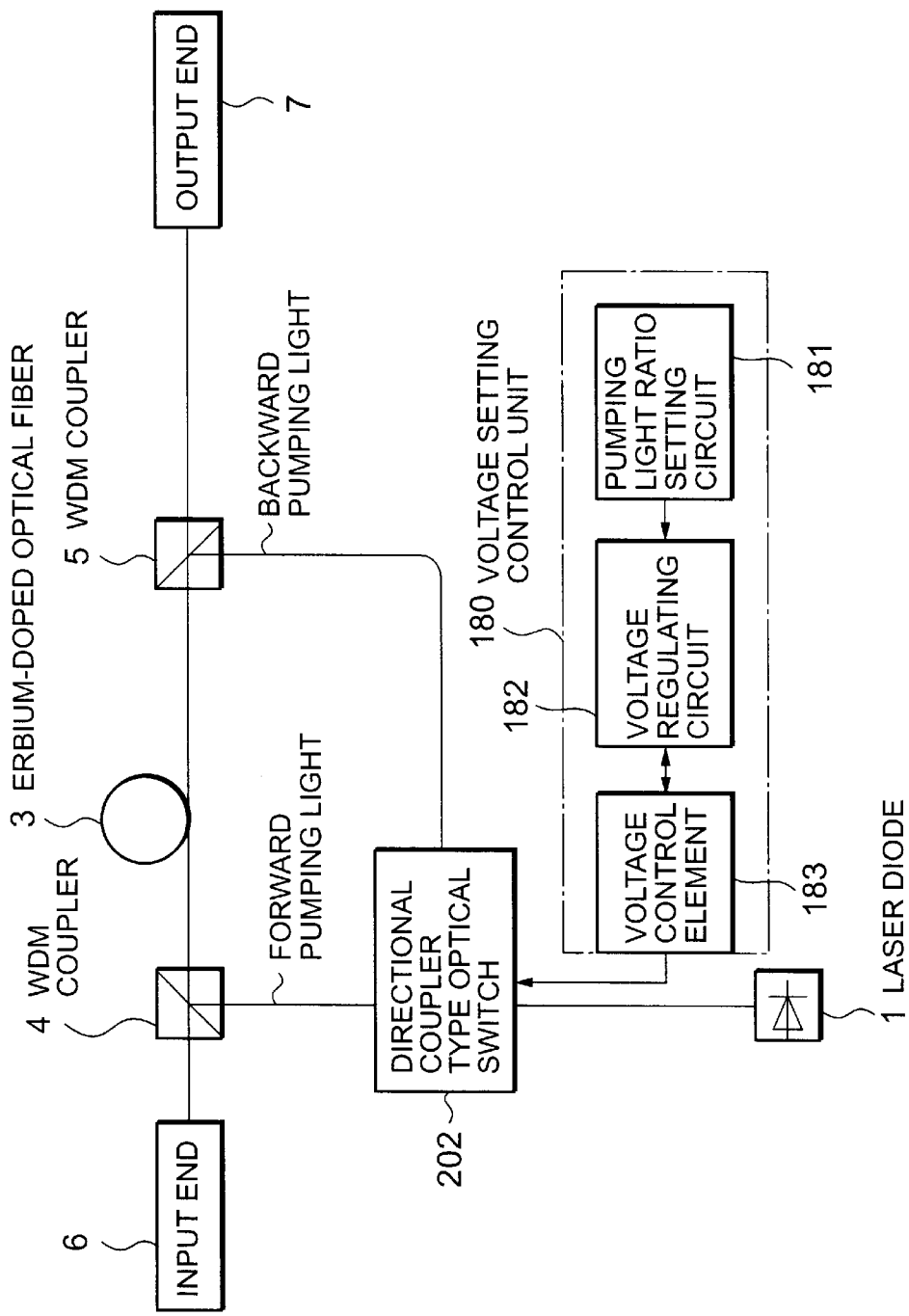
FIG. 16 is a block diagram of an arrangement applying a directional coupler type optical switch in the first embodiment.
Figure 17:
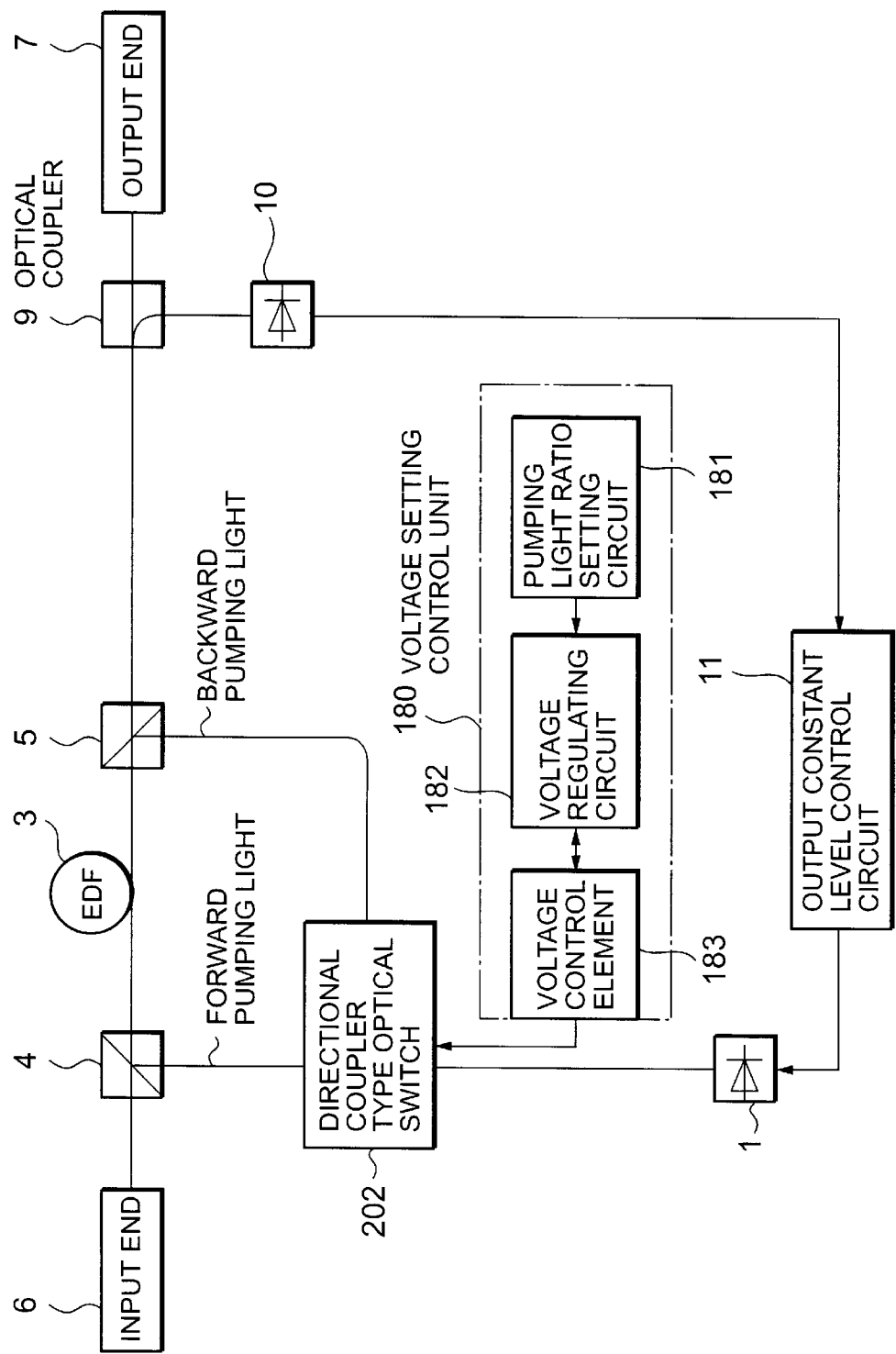
FIG. 17 is a block diagram of an arrangement applying a directional coupler type optical switch in the second embodiment.
Figure 18:
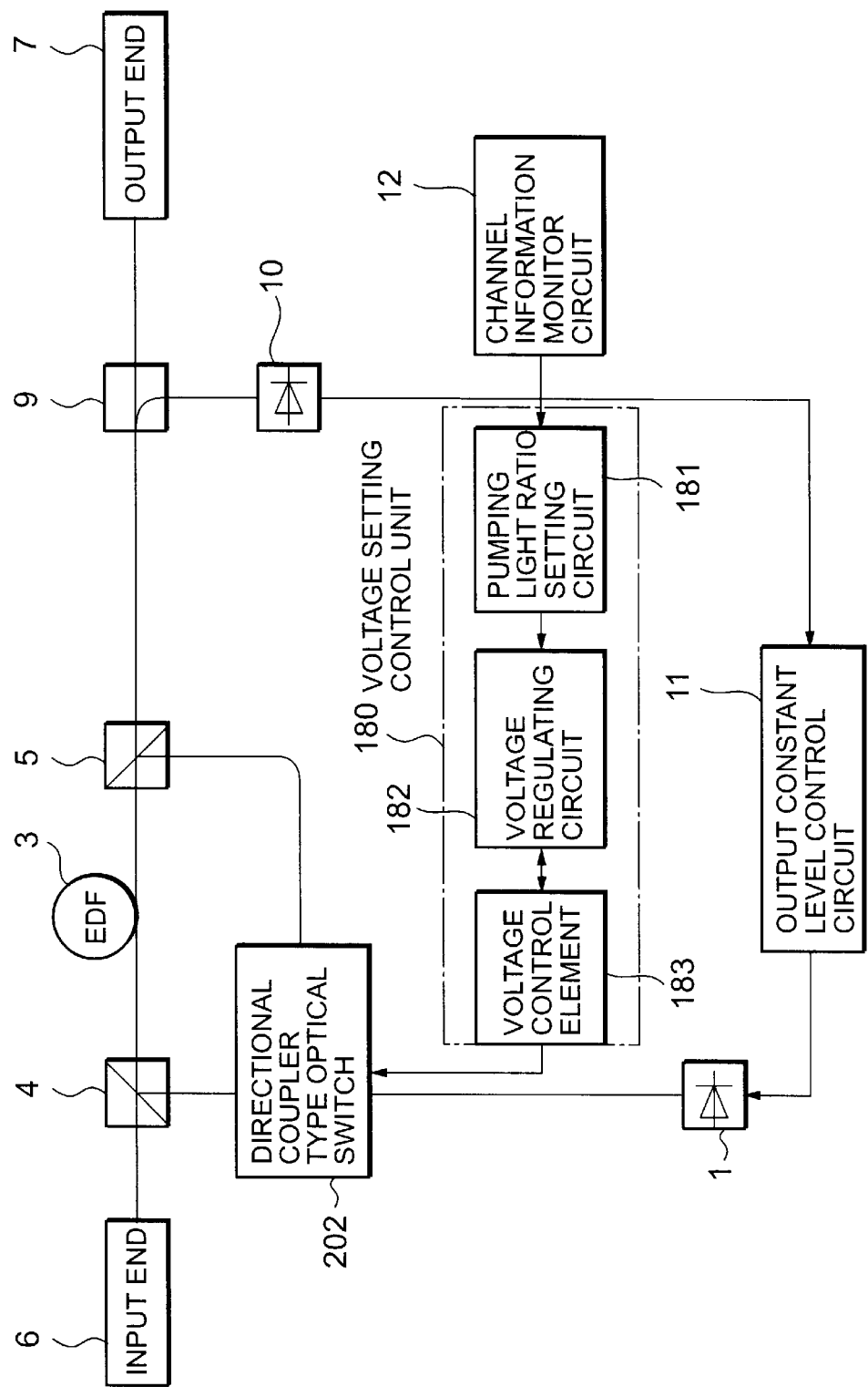
FIG. 18 is a block diagram of an arrangement applying a directional coupler type optical switch in the third embodiment.
Figure 19:
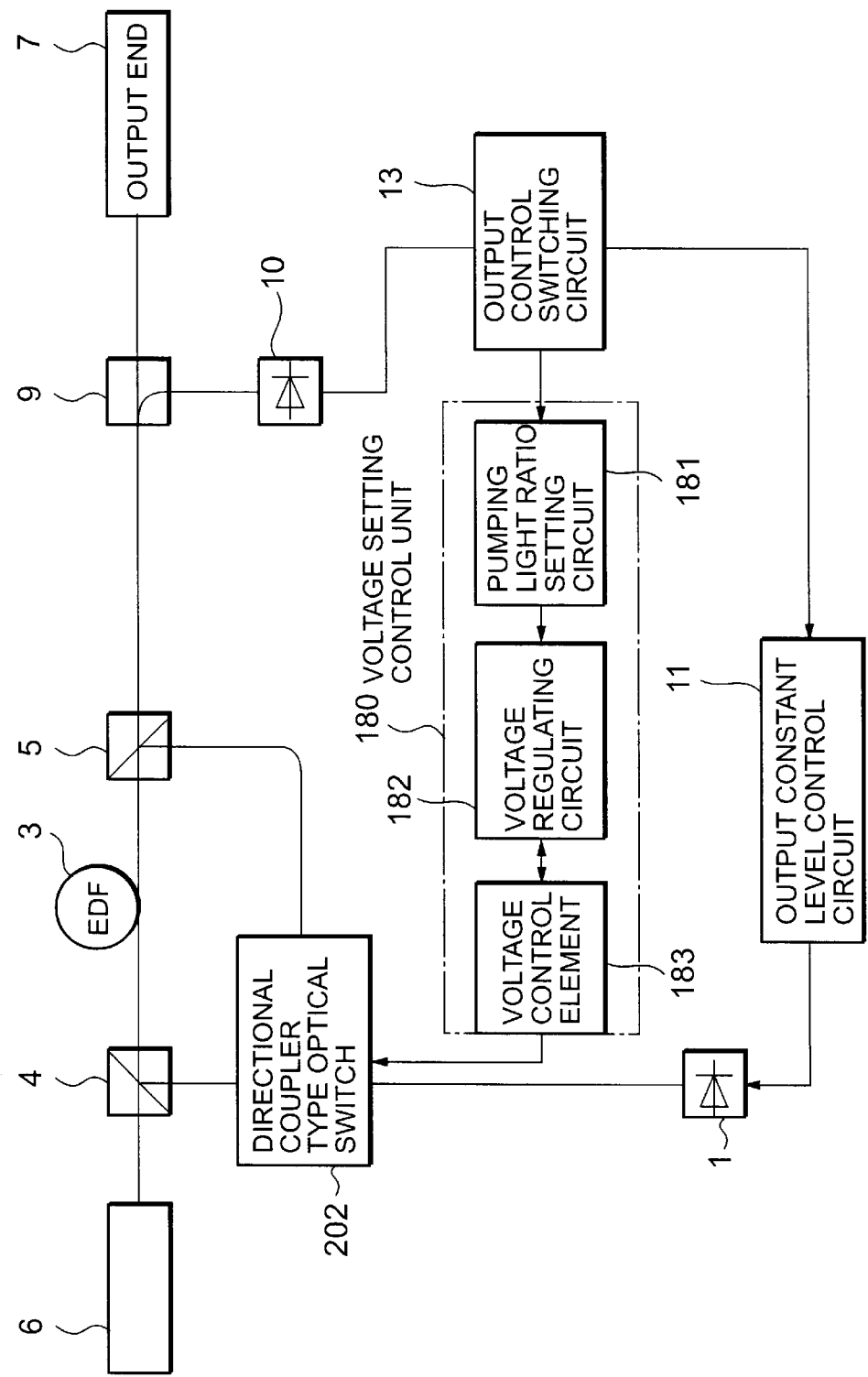
FIG. 19 is a block diagram of an arrangement applying a directional coupler type optical switch in the fourth embodiment.

In the arrangement as described above, it is assumed that wavelength of the laser diode 1 is changed and transmission characteristics of the WDM coupler 2 are on a fixed level. On the contrary, it may be designed in such manner that wavelength of the laser diode 1 is fixed and transmission characteristics of the WDM coupler 2 are changed. The features of this case are shown in FIG. 11 to FIG. 14 to correspond to the first to the fourth embodiments. In the features of FIG. 11 to FIG. 14, Mach-Zehnder interferometer type filter (M-Z filter) 200 is provided on an optical waveguide substrate instead of the WDM coupler 2. FIG. 15 shows the features of the M-Z filter and wavelength transmission characteristics. The transmission characteristics of the M-Z filter 200 can be changed by utilizing the change of refractive index due to heat generated in association with the application of electric signal to an electrode 201 charged on one of the branches of M-Z filter. In this arrangement, a voltage setting control unit 180 is used instead of the temperature setting control unit 8 as used in the first to the fourth embodiments. The voltage setting control unit 180 comprises a pumping light ratio setting circuit 181, a voltage regulating circuit 182, and a voltage control element 183.

The pumping light ratio setting circuit 181 sets the ratio of the forward pumping light intensity to the backward pumping light intensity. The voltage regulating circuit 182 determines a voltage to be applied on the electrode 201 to match the ratio set by the pumping light ratio setting circuit 181. The voltage thus determined is applied on the electrode 201 via the voltage control element 183. As the voltage control element 183, for instance, a buffer amplifier of known type may be used.

Here, the pumping light is branched off using M-Z filter, while Fabry-Perot filter or dielectric multilayer type filter maybe used instead. In this case, incident light and reflection light are used as the forward pumping light and the backward pumping light respectively.

Further, in a different arrangement, a laser diode 1 with a fixed wavelength and a power dividing device with a variable dividing ratio may be used. The arrangement in this case is shown in FIG. 16 to FIG. 19 to correspond to the first to the fourth embodiments. In this arrangement, a directional coupler type optical switch 202 provided on an optical waveguide substrate is used as a power dividing device. FIG. 20 shows the arrangement of the directional coupler type optical switch 202 and the relationship between input voltage and output optical power. The dividing ratio can be changed by an electric signal applied to an electrode 203 on the optical switch.

Figure 21:
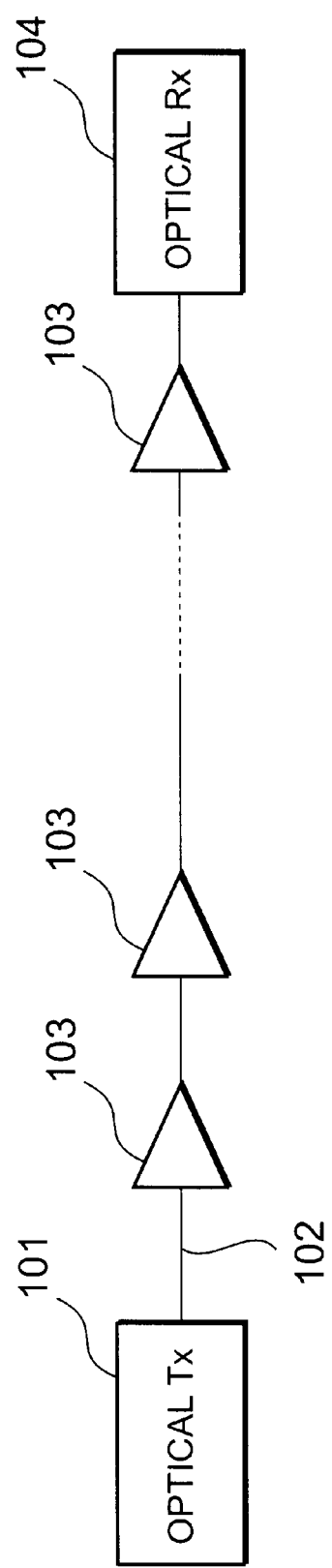
FIG. 21 is a diagram showing an arrangement of an optical transmission system.

FIG. 21 represents an arrangement of an optical transmission system, to which the above optical amplifier is applied. A transmission signal converted to an optical signal at an optical transmitter 101 is inputted to an optical fiber transmission line 102. To the optical fiber transmission line 102, a plurality of optical amplifiers 103 are arranged depending on transmission distance. As the optical amplifier 103, any of the optical amplifiers of the present invention as described above maybe used. The optical signal transmitted to the output end of the optical fiber transmission line 102 is received at an optical receiver 104 and is restored to an electric signal.

Here, the directional coupler type optical switch is used as the power dividing device, while it is not limited to this, and various types of optical switches may be used.

According to the present invention, even when a single pumping source is used, it is possible to obtain optimal noise characteristic and optimal output characteristics to match the changes of input/output conditions.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical amplifier, comprising:
a pumping source for outputting a pumping light;
a first optical dividing device for dividing said pumping light to a first and a second divided pumping light components;
an amplification medium, to which said first and said second pumping light components are inputted; and
a dividing ratio regulator for regulating power ratio of said first and said second divided pumping light components,
wherein
said pumping source comprises a laser diode;
said first optical dividing device comprises a WDM coupler;
said dividing ratio regulator comprises a temperature control circuit for regulating temperature of the laser diode; and
said temperature control circuit comprises:
a pumping light ratio setting circuit for setting power ratio of said first and said second divided pumping light components;
temperature regulating means for determining a preset temperature of said pumping source to match the ratio as set by the pumping light ratio setting means; and
temperature control means for controlling said pumping source to said preset temperature.

2. An optical amplifier, comprising:
a pumping source for outputting a pumping light;
a first optical dividing device for dividing said pumping light to a first and a second divided pumping light components;
an amplification medium, to which said first and said second pumping light components are inputted;

a dividing ratio regulator for regulating power ratio of said first and said second divided pumping light components;

a second optical dividing device for branching off optical output of said amplification medium;

an optical detector for detecting optical output branched off by said second optical dividing device; and an output control unit for controlling output optical power of said pumping source so that optical output of said amplification medium is to be a predetermined value to match optical output detected by said optical detector, wherein said optical amplifier further comprises a channel number monitor unit for monitoring number of channels of the signal inputted to said amplification medium; and said dividing ratio regulator determines said power ratio to match the number of channels as detected by said channel number monitoring unit.

3. An optical amplifier, comprising:

a pumping source for outputting a pumping light;

a first optical dividing device for dividing said pumping light to a first and a second divided pumping light components;

an amplification medium, to which said first and said second pumping light components are inputted;

a dividing ratio regulator for regulating power ratio of said first and said second divided pumping light components;

a second optical dividing device for branching off optical output of said amplification medium;

an optical detector for detecting optical output branched off by said second optical dividing device;

an output control unit for controlling output optical power of said pumping source so that optical output of said amplification medium is to be a predetermined value to match optical output detected by said optical detector, and an output control switching circuit for switching over the means for controlling said pumping source from said dividing ratio regulator to said output control unit in case said power ratio is turned to lower than a given value.

4. A method for optical amplification comprising steps of:

dividing a single pumping light at a given ratio to generate a first and a second divided pumping light components;

injecting said first and said second divided pumping light components to an amplification medium, monitoring number of channels of a signal inputted to said amplification medium; and setting said given ratio to match the number of channels detected by said monitoring step.

5. A method for optical amplification comprising steps of:

dividing a single pumping light at a given ratio to generate a first and a second divided pumping light components;

injecting said first and said second divided pumping light components to an amplification medium;

monitoring number of channels of a signal inputted to said amplification medium;

setting said given ratio to match the number of channels detected by said monitoring step;

controlling output optical power of said pumping source so that output optical power of said amplification medium will have a given value; and an output control switching process for switching over the control of said pumping source from said step of setting to said step of controlling in case said given ratio is turned to lower than a predetermined value.

* * * * *